Aug. 30, 1927.
T. BROWN
1,640,642
TRACTOR HITCH
Original Filed March 19, 1920   2 Sheets-Sheet 1
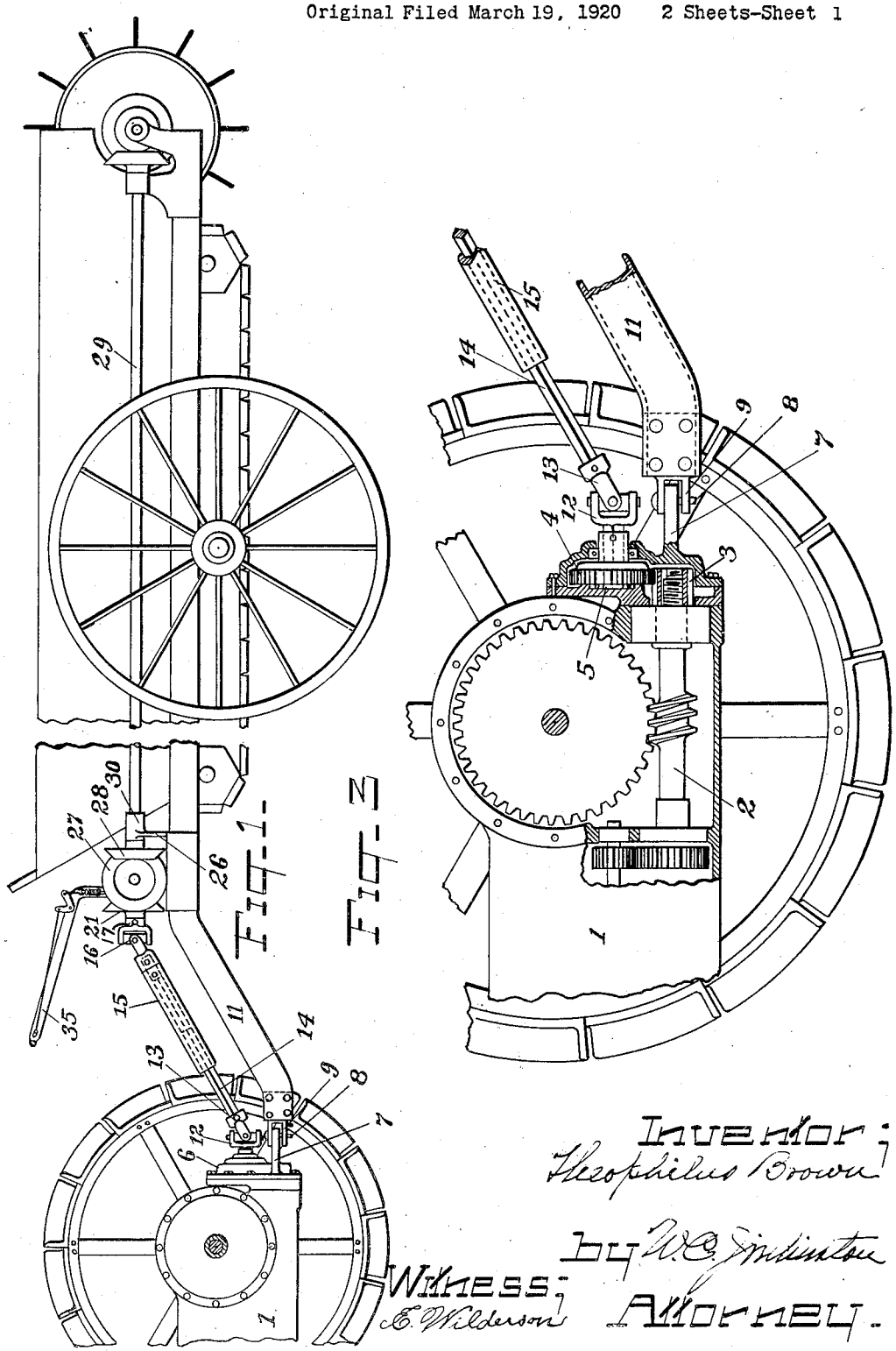
Inventor;
Theophilus Brown
by W.C. Symington
Attorney.
Witness;
E. Wilderson

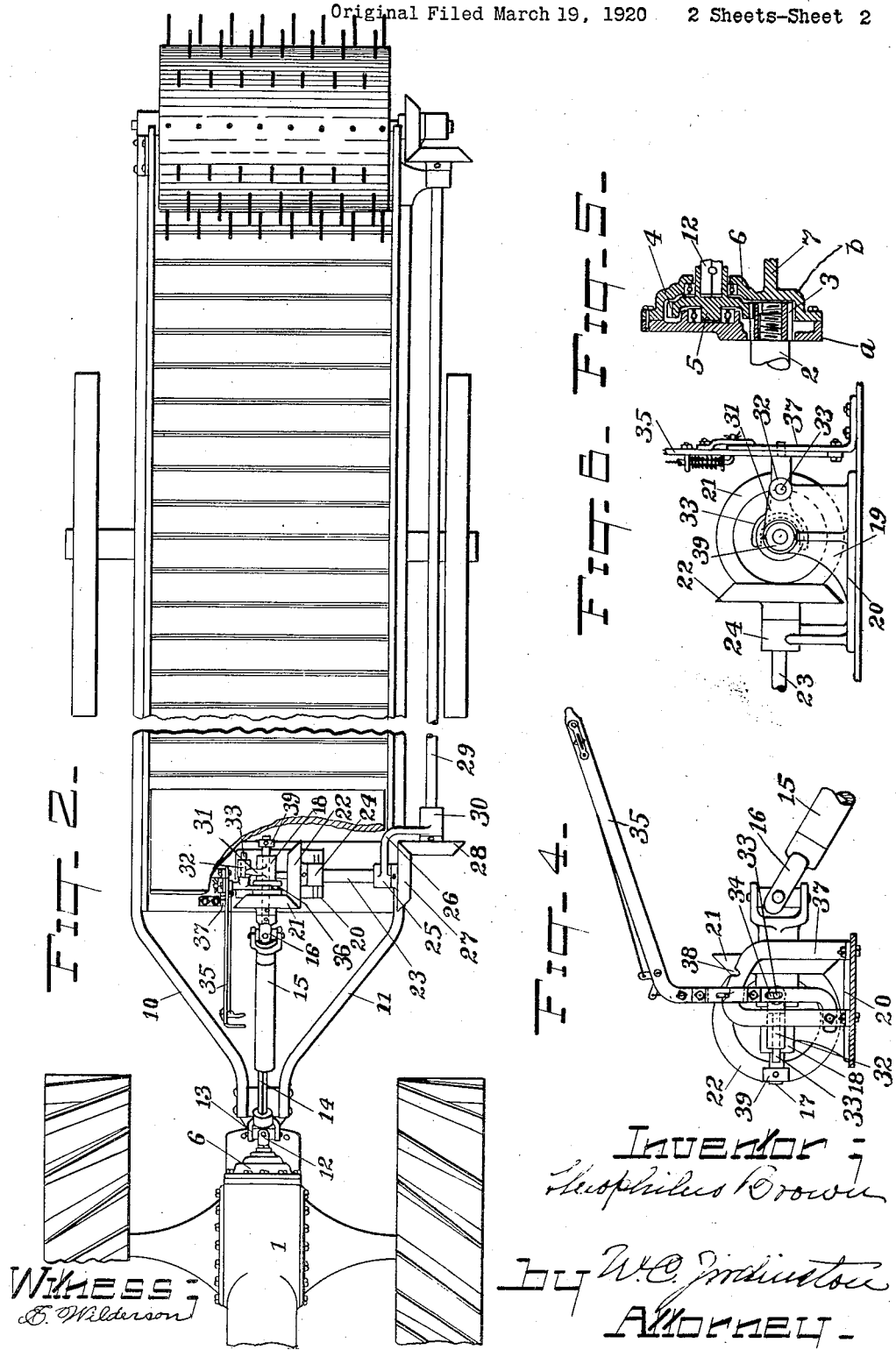

Patented Aug. 30, 1927.

1,640,642

UNITED STATES PATENT OFFICE.

THEOPHILUS BROWN, OF MOLINE, ILLINOIS, ASSIGNOR TO DEERE & COMPANY, OF MOLINE, ILLINOIS, A CORPORATION OF ILLINOIS.

TRACTOR HITCH.

Application filed March 19, 1920, Serial No. 367,133. Renewed July 18, 1923.

My invention relates to tractor drawn machines, particularly of the agricultural class, and has for its object the production of an improved, simple and effective means of connecting a tractor with an agricultural machine by a flexible draft device in order that both the tractor and attached machine can follow irregularities of the ground without cramping the connection.

A further object of my invention is to provide a flexible means of conveying power from the tractor to the drawn machine whereby the operative mechanism of the latter can be actuated at will.

Referring to the drawings in which similar numerals indicate identical parts—

Figure 1 is a side elevation of part of a tractor and an agricultural machine connected by my improved device.

Figure 2 is a plan view of Figure 1.

Figure 3 is an enlarged detail in part section, of the forward end of my device attached to the rear of a tractor.

Figure 4 is a detail side elevation of the forward part of the power conveying mechanism viewed from the direction shown by the arrow in Figure 2.

Figure 5 is a sectional detail of part of the gearing on the rear of the tractor, and Figure 6 is a rear view of Figure 4.

I have shown in the drawings as much of a tractor as is thought necessary to illustrate the attachment of my improved device thereto, and I have shown, in outline, a manure spreader to which my device is also connected and by which the spreader is not only drawn by the tractor but power from the latter is conveyed to operate the spreader mechanism.

The tractor 1 carries a power shaft 2 journaled in the frame centrally and longitudinally thereof in a suitable manner and rotatable by power from the motor of the tractor. This power shaft operates to drive the tractor through rear axle driving mechanism, illustrated in the present instance as comprising a worm 2ᶜ and worm wheel 2ᵈ, the latter having the usual driving connection through differential mechanism (not shown) with the rear axles 2ᵉ. This driving mechanism is enclosed in a houing 2ᶠ, which frequently constitutes part of the tractor frame. On the rear end of the shaft 2 is rigidly mounted a pinion 3 which meshes with a gear 4 having its hub 5 extended forwardly and supported in a bearing preferably integral with the rear of the tractor frame. The hub 5 is therefore a revoluble member which has positive connection with the drive shaft 2. A housing 6 composed of parts a and b is securely bolted to the rear of the tractor frame and covers the pinion 3 and gear 4 from damage by dust or trash.

Extending rearwardly from the housing 6, and preferably integral therewith, is a drag piece 7 to which is pivotally connected, by a vertical bolt or pin 8, a coupling 9 rigidly secured between the converging forward portions of bars 10 and 11 which are part of the frame of the spreader. From the coupling 9 the bars 10 and 11 incline to the plane of the bottom of the spreader body, this inclination being necessary because of the difference in height between the spreader and the tractor, but it is obvious that when other agricultural machines are to be drawn by the tractor the means employed to connect the tractor with such machines may vary in inclination or be horizontal.

The hub 5 of the gear 4 lies in the central longitudinal vertical plane of the tractor and constitutes a power transmitting shaft which derives power from the drive shaft 2 of the tractor and transmits it to the driven mechanism of the trailing implement. To this end it is extended rearwardly and projects through the housing 6, in which it is supported, and is provided with a socket for reception of a part 12 of a knuckle or universal joint the second half 13 of which is rigidly attached to a squared shaft 14, the pivot of the universal joint and the pivot 8 being in the same vertical plane. The shaft 14 is movable longitudinally in a sleeve 15, which is squared interiorly to receive it; and a knuckle or universal joint 16 connects the sleeve 15 to a shaft 17 journaled to rotate in a bearing 18, the latter being preferably integral with a vertical standard 19 on a base 20 which is rigidly attached to a transverse part of the forward frame of the spreader. I thus provide a flexible connection between the hub 5 and the shaft 17. A bevel gear 21 is rigidly secured on the shaft 17 and meshes with a similar bevel gear 22 which is keyed or otherwise secured on a shaft 23 which is the actuating shaft of the implement, and is rotatably journaled in a bearing 24, on the base 20, and a bearing 25 on a bracket 26 mounted on a side of the spreader frame.

The shaft 23 extends beyond the bearing 25 and on its end portion is secured a bevel gear 27 which meshes with a similar gear 28 rigidly mounted on a shaft 29 journaled to rotate in a bearing 30 on the bracket 26. The shaft 29 extends rearwardly and is connected in any suitable manner with the spreader mechanism which it is adapted to operate.

An arm 31 extends from the bearing 18 and carries a bearing 32 in which is slidably supported the standard of a T shaped member 33; one arm of the T shaped member 33 engages with a slot 34 in the vertical portion of a lever 35, and the opposite arm engages with a circumferential groove 36 in the hub of the bevel gear 21. The lever 35 is pivotally supported on a bracket 37, mounted on a transverse part of the spreader frame, and is bent to extend toward the tractor and provided with a well known type of latch to engage with either of two notches 38 in the curved upper edge of the bracket 37.

The parts just described constitute a clutch mechanism at the end of the actuating shaft 23 adjacent to the flexible connection hereinbefore described by which the operation of the spreader is controlled, for it is evident that when the lever 35 is rocked forwardly on its pivot the T shaped member will also move forwardly sliding the shaft 17 in the same direction until a roller 39, on the shaft 17, contacts with the bearing 18, or until the latch of the lever 35 engages with the forward notch 38. As the shaft 17 is moved forwardly the bevel gear 21 is separated from the bevel gear 22 and in consequence the mechanism of the spreader ceases to operate.

Rocking the lever rearwardly will reverse the operation just described and the parts will again be in position to operate the spreader, as shown in the drawings, it being understood that when the lever 35 is actuated the shaft 14 and sleeve 15 telescope to accommodate the longitudinal movement of the shaft 17.

The pivotal connection of the spreader to the drag piece 7 is sufficiently loose to permit either the tractor or the spreader to angulate vertically in traveling over irregular ground and to swing freely or angulate relatively to the central longitudinal vertical plane of the machine when making a turn, and because of the flexible nature of the power connection between the tractor and the spreader power will be conveyed without cramping or binding the mechanism in any way.

What I claim is:—

1. In combination with a tractor, an agricultural machine having operative mechanism, a shaft on the tractor rotatable by power from the motor thereof to actuate the tractor wheels and extending to the rear of the tractor, a housing on the rear of the tractor, a pinion on the rear of said shaft within the housing, a gear journaled in the housing and meshing with said pinion and having its hub extended rearwardly through the housing, and means connecting said hub with the operative mechanism of said machine.

2. In combination with a tractor, an agricultural machine having operative mechanism, a shaft on the tractor rotatable by power from the motor thereof to actuate the tractor wheels and extending to the rear of the tractor, a housing on the rear of the tractor. a pinion on the rear of said shaft within the housing, a gear journaled within the housing above the pinion and meshing therewith, the hub of said gear extended rearwardly through the housing, means connecting said hub with the operative mechanism of said machine, and a hitch device extending rearwardly from the housing.

3. In combination with a tractor having a centrally and longitudinally disposed power shaft extending to the rear of the tractor, an agricultural machine having operative mechanism, a housing on the rear of the tractor, a pinion on the rear of said shaft within the housing, a gear journaled in the housing and meshing with said pinion and having its hub extended rearwardly through the housing, and means connecting said hub with the operative mechanism of said machine.

4. The combination with a tractor having a drive shaft and a housing therefor, of a draft member for a trailing implement secured to said housing, a revoluble member mounted in said housing and geared to said drive shaft, operating mechanism carried by the trailing implement, flexible means having a vertical pivotal connection with said revoluble member and connected with said operating mechanism, and means connecting said draft member with the trailing implement, comprising a draft connection having a vertical pivotal connection with said draft member substantially in vertical alinement with the pivotal connection of said flexible means with said revoluble member, said connections being constructed and arranged to permit relative angulation of said tractor and trailing implement either vertically or horizontally with substantially uniform transmission of power from the drive shaft to said operating mechanism.

5. The combination with a tractor having a drive shaft and a housing therefor, of a draw bar for a trailing implement secured to said housing, a revoluble member mounted in said housing and geared to said drive shaft, an actuating shaft for said implement, means flexibly connecting said revoluble member with said actuating shaft, said means including clutch mechanism and a telescopic shaft having a universal joint connection with said revoluble member, means operable to shift said clutch mechanism, and draft means connected with said trailing implement and pivotally connected with said draw bar substantially in vertical alinement with said universal joint.

6. The combination with a tractor having a drive shaft and a housing therefor, of a draw bar for a trailing implement secured to said housing, a revoluble member mounted in said housing and having positive connection with said drive shaft, an actuating shaft for said implement, means flexibly connecting said revoluble member with said actuating shaft, said means including clutch mechanism at the adjacent end of said actuating shaft, and a telescopic shaft having a universal joint connection with said clutch mechanism and with said revoluble member, means operable to shift said clutch mechanism, and draft means connected with said trailing implement and pivotally connected with said draw bar substantially in vertical alinement with the latter universal joint.

7. In an apparatus of the class described, the combination of a tractor comprising a rear axle and rear axle drive mechanism, a power-transmitting shaft mounted on said tractor, gear means connecting said power transmitting shaft with said rear axle drive mechanism, a housing enclosing said gear means and said rear axle drive mechanism, a trailing implement drawn by the tractor and carrying relatively moving driven mechanism, and devices for positively hitching the trailing implement to the tractor and for transmitting power from said power transmitting shaft to such driven mechanism comprising a driving connection pivotally connected with said power transmitting shaft to swing laterally relatively thereto, and operatively connected with said driven mechanism, and a hitch connection having a vertical pivotal connection with said tractor in substantial vertical alinement with the pivotal connection of said driving connection with said power transmitting shaft, thereby permitting angulation of either element thereof relatively to the longitudinal vertical plane of said power transmitting shaft, while uniformly transmitting power to said driven mechanism.

8. In an apparatus of the class described, the combination of a tractor comprising rear axles and rear axle drive mechanism, a housing enclosing said rear axle drive mechanism, a power transmitting shaft extending from the rear end of said housing, gear means within said housing for connecting said power transmitting shaft with said rear axle drive mechanism, a trailing implement drawn by the tractor and carrying relatively moving driven mechanism, and devices for positively hitching the trailing implement to the tractor and for transmitting power from said power transmitting shaft to such driven mechanism, comprising a second shaft, a universal joint connecting said second shaft to said power transmitting shaft, and a hitch connection having a vertical pivotal connection with said tractor in substantial vertical alinement with said universal joint, thereby permitting angulation of either element thereof relatively to the longitudinal vertical plane of said power transmitting shaft while uniformly transmitting power to said driven mechanism.

THEOPHILUS BROWN.